United States Patent [19]

Florent

[11] Patent Number: 5,355,326
[45] Date of Patent: Oct. 11, 1994

[54] METHOD OF EFFECTING A MOTION FILTERING FOR SLOW TARGETS, AND AN APPARATUS FOR EXECUTING THE METHOD

[75] Inventor: Raoul Florent, Liller, France

[73] Assignee: U.S. Philips Corporation, New York, N.Y.

[21] Appl. No.: 174,738

[22] Filed: Dec. 29, 1993

Related U.S. Application Data

[63] Continuation of Ser. No. 803,301, Dec. 2, 1991, abandoned.

[30] Foreign Application Priority Data

Nov. 30, 1990 [FR] France .............................. 90 15026

[51] Int. Cl.$^5$ .............................................. G01S 5/06
[52] U.S. Cl. .................................. 364/516; 324/160; 348/149; 348/169; 348/208; 348/416
[58] Field of Search ........................ 342/160, 161, 162; 364/516; 358/105, 125, 136, 135

[56] References Cited

FOREIGN PATENT DOCUMENTS 9112584 12/1990 World Int. Prop. O. .

OTHER PUBLICATIONS

I. K. Sethi et al., "Finding Trajectories of Feature Points in a Monocular Image Sequence", IEEE Transactions on Pattern Analysis and Machine Intelligence, vol. PAMI-9, No. 1, Jan. 1987, pp. 56–73.

V. S. S. Hwang, "Tracking Feature Points in Time—Varying Images Using an Opportunistic Selection Approach", Pattern Recognition, vol. 22, No. 3, 1989, pp. 247–256.

Primary Examiner—Jack B. Harvey
Assistant Examiner—Kamini Shah

[57] ABSTRACT

A method of producing a motion filter for detecting point targets moving slowing within a sequence of readjusted binary images, these images corresponding to a history at the instant $n-1$, denoted Hist $n-1$ (1), including target trajectories and alarms. This method includes: A) an initializing step having a sub-step of accumulating results arising from an extractor and which consist of the coordinates $h_j$ of the start-points of trajectories and of the coordinates $C_i$ in Hist$(n-1)$ (1); B) a step for constructing the history at the following instant n, denoted Hist N (2), having two loops: B1) a first loop for producing either the lengthening or the initializing of the trajectories depending on the alarms received; B2) a second loop for producing either the lengthening or the destruction of the trajectories not depending on the alarms received; C) a step for detecting the targets from observation of Hist n (2).

14 Claims, 1 Drawing Sheet

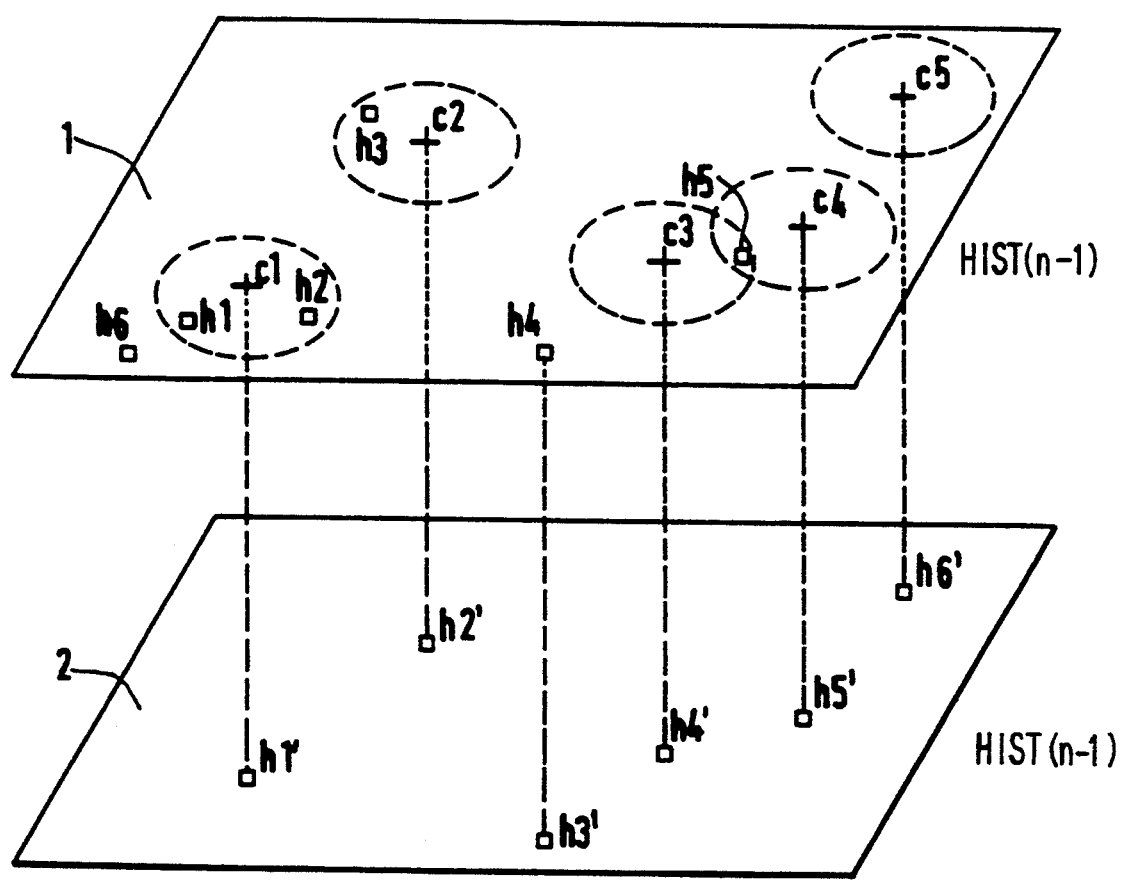

METHOD OF EFFECTING A MOTION FILTERING FOR SLOW TARGETS, AND AN APPARATUS FOR EXECUTING THE METHOD

This is a continuation of pending prior application Ser. No. 07/803,301, filed on Dec. 2, 1991 now abandoned.

BACKGROUND OF THE INVENTION

The invention relates to a method of effecting a motion filtering for detecting point targets moving slowly within a time sequence of readjusted binary images, these images corresponding to a history at the instant n−1, denoted Hist n−1, including target trajectories and alarms.

The invention is applicable for example in the monitoring of road traffic.

There is already known from the state of the art a so-called Kalman filtering method based on the prediction of trajectories. However, in its current usage the Kalman method is very complicated since it generates a large number of paths in order to try to connect each trajectory with each one of the new alarms which appear. It is therefore very expensive in terms of computation time and in memory. On the other hand, it can be used for rapidly moving targets, that is to say assuming a movement greater than 10 pixels between two successive images.

One of the objects of the invention is to provide a method applicable to the detection of slow targets, and which gives results which are all the better the slower the targets.

Another object of the invention is to provide such a method which is inexpensive in terms of computation time and memory.

Another object of the invention is to provide a method which is easy and inexpensive to implement.

Now, the detection of slow targets presents a certain number of problems which the invention proposes to solve in order to achieve its objects.

It will be noted that the detection of motion in a sequence of images implies firstly determining a difference between two consecutive images, in such a way as to show up the moving portions and the stationary portions. However this difference, termed first order difference, does not provide sufficient elements to produce the detection of point targets in a sequence of images, when these targets have a slow motion. difference image there are contributions due to noise, which may give the impression of moving objects or of targets.

Secondly, the images must be readjusted. This is required because, in general, the camera which acquires the images to be treated is not sufficiently stable. It is itself mobile, either if it is mounted on a moving vehicle, or it is mounted on a structure which may oscillate for example in the wind. The images acquired are therefore readjusted relative to one another in such a way that the background, for example, appears stationary in the sequence of images. The readjustment is effected by a method known per se, and which does not, therefore form part of the invention. However, it appears that the readjustment is never perfect. It generally leads to readjustment errors of the order of a pixel, which means that between two consecutive images, there appear systematic errors of the order of a pixel where corresponding portions of the images coincide. As a result of this, in the difference image, the contribution is found from these readjustment errors which can likewise be mistaken for moving objects. On the other hand, in the method of readjustment, there may moreover appear occasional sizable errors extending over a not insignificant proportion of successive images in the sequence of images. The contribution from these occasional errors, which are due to the method of readjustment, are also a source of errors in the detection of slow moving targets.

Thirdly, among the objects which may appear in the images, there are a certain number of targets which it is not wished to detect. These are for example, trees or clouds in motion, or portions of the background subject to variations in lighting. On the contrary, one of the aims of the invention is the detection of moving bodies having relatively continuous and relatively uniform trajectories.

SUMMARY OF THE INVENTION

These problems are solved and the various aims of the invention are achieved by means of a method such as defined in the preamble and characterised in that it comprises:

A/ an initialising step of the method having:

A1/ a sub-step of accumulating results arising from an extractor and which consist of the coordinates hj of the start-points of trajectories at the instant n−1 and of the coordinates Ci of the alarms at the instant n−1;

B/ a step for constructing the history at the next-following instant n, denoted Hist n, having two loops:

B1/ a first loop for producing either the lengthening or the initialising of the trajectories depending on the alarms received;

B2/ a second loop for producing either the lengthening or the destruction of the trajectories not depending on the alarms received;

C/ a step for detecting the targets from observation of the history at the instant n.

Under these conditions the method according to the invention can be easily implemented through simple functions within memories. It consumes little computation time and little memory, and the detection is of very high quality, in particular:

the rate of false alarms does not exceed 1 false alarm every 20 min, the rate of detection of targets of interest is of the order of 100%.

The invention also relates to an appartus comprising digital data processing means for executing a method according to the above.

BRIEF DESCRIPTION OF THE DRAWINGS

The invention is described in detail below with reference to FIG. 1 which represents the updating of the order n coordinates from the order (n−1) coordinates.

DESCRIPTION OF THE PREFERRED EMBODIMENTS

The main object of the method according to the invention is providing a motion filter for the detection of point targets moving slowly in a sequence of images.

Within the framework of operation described above, and in the light of the objectives of the present invention, a difference is firstly produced between each consecutive image of the sequence: however, in order to carry out the detection we shall not restrict ourselves to the exploitation of this simple difference in images.

The method according to the invention operates on coordinates of the centres of gravity of the zones generated in the difference image, that is to say arising from the first order difference between two consecutive readjusted images.

An extractor known per se and not described here is used to provide these coordinates.

The main aim of the invention then amounts to exploiting all these coordinates, in then constructing trajectories, and finally producing measures making it possible to estimate whether these trajectories correspond to the trajectories of conventional moving bodies, vehicles for example, travelling within a scene, or whether these trajectories genuinely correspond to false alarms.

A vehicle travelling in a conventional manner must be understood to mean a vehicle having a certain inertia, and a reasonably smooth, continuous and steady trajectory. Efforts will be made to eliminate the trajectories of moving objects such as trees, clouds and flags. These objects exhibit trajectories which are somewhat incoherent or erratic or even oscillatory, or totally erratic.

Now, the case is considered in which the coordinates of the zones extracted from the difference images are provided with an accuracy of several pixels, this often being the order of magnitude of the displacement of the targets, because the aim is to provide a method which applies to slow targets, that is to say those with a movement not exceeding 10 pixels between two successive images.

A false alarm must therefore be understood to mean alarms caused by contributions from noise, readjustment errors and spurious movements.

On the other hand, in the detection of targets, there is a further difficult case, namely that of the intersections of trajectories. It is supposed that, at the instant $n-1$ of a sequence of images, the state of the method, or algorithm, corresponds to a history denoted "Hist($n-1$)" which is formed of all the trajectories and their characteristics. In the case of an intersection, two or more trajectories are held in Hist($n-1$), having trajectory start-points labelled with an element hj, and lying close to an incoming alarm Ci also in Hist($n-1$). The problem of constructing trajectories depending on the new alarm has no obvious solution. According to the invention, in the desire to present a rapid method requiring little storage, the matching problem is solved by firstly ensuring oneself of the validity of the trajectories through an activity measure. In the case in which at least two trajectories are valid, the intersection is declared and a countdown counter associated with the alarm is set going. From the point of intersection onwards, evaluation of the trajectories is recommenced whilst disregarding the past. On the other hand, in the last step of the method, or detection step, the alarms for which the counter will be turned on will be selected independently of the confidence measures.

This method makes it possible both to avoid multiplication of the number of potential trajectories, that is to say combinatorial explosion inherent in conventional usage of Kalman filtering already mentioned, and to avoid false matchings. In fact, if a false alarm is found near a valid trajectory, the counter is not turned on since this false alarm has no past. This situation will not actually correspond to an intersection.

Again, the object is to provide a method which is less costly in computation time and in memory capacity. Consequently, when alarms cannot be associated with trajectories for a certain time, they will be eliminated from the history.

The measure which will finally be used to select between false and genuine alarms will have to be a robust measure. This is by virtue of aspects stated earlier regarding the inaccuracy of the centres of gravity, regarding the readjustment errors and regarding the fact that it is desired to detect small movements. Hence, to produce good quality detection, within the conditions imposed, the information relating to a movement will be summed over several images, typically 5 to 10 images. In fact, it is considered that a good detection decision can be taken only after locating the coherent, smooth and continuous trajectories for such a number of images. To pick out the coherent trajectories, a thresholding operation is established of the order n history so as to determine whether, for each order n alarm, it relates to an alarm linked with an object trajectory to be detected or to a false alarm trajectory.

To implement the method according to the invention, the elements are firstly defined, then the functions employed are defined. Among these definitions are:

a) as illustrated diagrammatically in FIG. 1, on an order $(n-1)$ image, denoted Hist($n-1$) and referenced 1, elements $h_1, h_2, h_3, \ldots h_i$, which are elements of $R \times R$ plane; each point $h_j$ is the physical position corresponding to the start-point of a trajectory j at the instant $n-1$;

b) an activity measure A(h) which sums the number of times for which the element h has been matched with a trajectory; this is the activity of the point h;

c) a confidence measure M(h) regarded in relation to the false alarms or to the targets, h belonging to Hist($n-1$), h' being its correspondent in Hist(n), Hist(n) being referenced 2 in FIG. 1;

d) a countdown counter T(h) which is triggered when an intersection is detected;

e) a mathematical distance d for points $h_1$ and $h_2$ in $R \times R$, and which is written $$d(h_1, h_2);$$

f) for the activity measure A(h), two auxiliary functions:
 a function More [A(h)] which renders the element h more active;
 a function Less [A(h)] which renders the element h less active.

These two functions More, and Less, are updating functions which allow the activity measure A to be updated at each step; if, through the activity measure, the conclusion is reached that an element has not been associated with trajectories for a certain time, it will be eliminated from the history;

g) for the confidence measure M(h), for h belonging to Hist($n-1$) and h' its correspondent in Hist(n), the updating function M(h) which is a function of two variables R such that:

$$M(h') = R[M(h), h \, h']$$

a relationship in which h h' is the vector linking h to h'.

This relationship expresses the fact that in order to update the order $(n-1)$ confidence to compute the order n confidence, use is made of the order $n-1$ confidence and the innovation which is represented by the vector h h' corresponding to the displacement of an alarm between $n-1$ and n.

Having presented the prior functions, according to the above method, Hist n will be computed from both Hist(n−1) and new order n−1 incoming alarms, denoted ALARM. We write:

$$Hist\ n = Hist(n-1) + ALARM$$

following which, detection will be effected.

The functions presented above still require the definition of parameters, namely:
START for triggering or starting the intersection counter, or countdown counter;
   $d_0$ which is a distance threshold between the alarms Ci and the points hj,
   $M_0$ confidence threshold
   $A_0$ death threshold,
these parameters are stipulated as initialising parameters for the method.

A/ FIRST STEP OF THE METHOD $A_1$) this step comprises the accumulating of the results arising from an extractor. At the output of the extractor is found the order n−1 history denoted Hist(n−1) and referenced 1 in FIG. 1, and which is composed of the coordinates $h_1, h_2, h_3, \ldots h_j$ of the start-points of trajectories, and there are found the coordinates $C1, C2, \ldots Ci$ of the order n−1 incoming alarms, these being the coordinates of the centres of gravity of the zones generated by the difference image, that is to say the centre of a circle of radius $d_0$ in which it is sought to match the trajectories and the alarms. The order n history is constructed by comparing the order n−1 history and the order n−1 incoming alarms.

$A_2$) This first step further comprises the copying of the coordinates of the new alarms Ci into the history to be constructed Hist n. This involves a computerised copying. The projections of the alarm Ci are determined, and they are positioned in the history to be constructed Hist n, referenced 2 in FIG. 1.

The projection of Ci in Hist n will be denoted $h_i'$. For example, referring to FIG. 1: $h_1'$ is the projection of C1 in Hist n.

$A_3$) This first step also comprises the search for the neighbours of the alarms Ci, these neighbours being sought in Hist(n−1). In this sub-step, the points of the order n−1 history are sought which are located at a distance from the alarms Ci less than the distance $d_0$ stipulated as initialising parameter for the method or algorithm. This parameter $d_0$ is fixed A PRIORI, and is of the order of the maximum displacement of the targets treated in the present method, that is to say 5 to 10 pixels between two images of the sequence of images. Hence, the neighbours hj are sought lying within small circles of radii $d_0$ and with centre each one of the Ci such that hj satisfies $$d(Ci,\ hj) < d_0.$$

Referring to FIG. 1, by way of example several cases can be presented:
Case No. 1: there are no neighbours. This is the case for C5 in FIG. 1.
Case No. 2: there is a single neighbour. This is the case for $h_3$ with regard to C2 in FIG. 1.
Case No. 3: there are several neighbours. This is the case for $h_1$ and $h_2$ with regard to C1 in FIG. 1.
Case No. 4: there are the coordinates hj of the start-point of trajectories which are not close to an alarm Ci. This is the case for h4 in FIG. 1.

B/ SECOND STEP OF THE METHOD

This second step comprises two loops.
B1/ In the first loop will be treated cases No. 1, No. 2, and No. 3 described above, that is to say depending on the alarms received trajectories will be
either lengthened,
or initialised.
Referring to FIG. 1 for example we shall consider the points hj at which the trajectories terminated at the instant n−1, then, if there is an alarm Ci near this point, that is to say at a distance less than $d_0$, action is taken to link the point hj and the alarm Ci in question, so as to lengthen the trajectory.

If on the other hand there is an isolated target Ci, that has no nearby trajectory, then action is taken to initialise a trajectory at the start of this target or alarm.

This first loop of the method evolves in two steps B11 and B12, each step comprising three sub-steps treating cases No. 1, No. 2 and No. 3.

B11/First step of the first loop.

B11a/ Case No. 1. There is no neighbour around an alarm. In this step nothing is done (case C5 of FIG. 1).

B11b/ Case No. 2. There is a single neighbour hj near an alarm Ci (case C2, h3 of FIG. 1). A work register h is reserved, and this single neighbour is assigned to h. We write h=hj, for example $h = h_3$.

B11c/ Case No. 3. There are several neighbours close to an alarm Ci (case C1 of FIG. 1). In this case, the neighbour having the greatest activity is assigned to the register h defined above. For example, in FIG. 1, $h_1$ and $h_2$ are found to be neighbours of the alarm C1. If the activity of $h_2$ is greater than the activity of $h_1$:

$$A(h_2) > A(h_1).$$

$h_2$ is assigned to the work register h, and we write:

$$h_2 = h.$$

However, the activity of the less active neighbours, here hi, is also considered in relation to the activity threshold $A_0$ defined as an initialisation parameter for the method.

For example, if both $h_1$ and $h_2$ have activity greater than the activity threshold $A_0$, then the countdown counter T is set going, which amounts to saying that an intersection has been detected.

$$\text{We write } T(hi') = START$$

where hi' is the correspondent of the alarm Ci under consideration, in Hist n (see step A, $A_2$).
In the example considered: $T(h_1') = START$.

On the other hand, if only one of the neighbours shows activity greater then the threshold $A_0$, then the countdown counter is set to 0, and we write:

$$T(hi') = 0$$

In the example considered, if $h_1$ alone has activity greater than $A_0$, we write $T(h_1') = 0$.

B12/ Second step of the first loop.
This second step consists in updating the activity and confidence functions and the intersection counter.

B12a/ Case No. 1 (no neighbour, example $C_5$).

We proceed with the method by setting all the measures to 0.

$$A(hi') = A_0$$

$$M(hi') = M_0$$

$$T(hi') = 0$$

A new alarm (or new comer) has thus been located which is not linked to the order n−1 history, and which constitutes an order n trajectory initialisation.

B12b/ Case No. 2 (1 neighbour, example $C_2$). We are dealing with a simple, unambiguous trajectory. The activity is increased; and we update as follows:

$$A(hi') = More(A(h))$$

$$M(hi') = R[M(h), h\ hi']$$

$$T(hi') = T(h) - 1$$

which means that the intersection counter is decremented by one unit.

B12c/ Case No. 3. Here again there are the two possible cases envisaged above.

If the counter has not just started up T(hi')<START, confidence can be ascribed to this as the case of a single trajectory, and updating is carried out as for the heading B12b.

If the counter equals START, an intersection is detected. In this case the confidence measures are reset to their initial values.

$$M(hi') = M0.$$

B2/ Second loop in which case No. 4 described under heading A3/ is treated, which therefore applies to those elements hj of Hist(n−1) which are remote from any alarm, that is to say which satisfy:

$$d(Ci, hj) > d_0.$$

In this case we cannot match the elements hj to an alarm, and proceed as follows:

B21/ Updating of the activity.

The activity of each element hj is revised downwards:

$$A(hj) = Less[A(hj)].$$

B21/ At the termination of this operation, two cases may appear: either A(hj) remains greater than the death threshold, (the case of element $h_4$ in FIG. 1), hence the coordinates are copied into Hist n:

hi': hj for example $A(h_4)$>death threshold, $h_3'=h_4$ and the confidence measure is updated with the vector 0 through the function R, indicating the absence of any displacement:

$$M(hi') = R[M(hj), 0]$$

or A(hj) is equal to the death threshold, and in this case the element is killed. There is no correspondent in Hist n.

C/ Detection over Hist n.

Detection is carried out for each element hi' over Hist n. To this end, we examine whether the confidence measure is greater than the detection threshold or whether the counter is active. In both either case the trajectory is selected as that of a potential target. Therefore, if a trajectory is fairly reliable or certain, or if an intersection has recently been detected, hi' is selected as a potential target. This can be written:

if M(hi') > detection threshold or if T(hi') > 0 then hi' is a potential target.

Thus, with the method described above it has been possible either to lengthen a trajectory, or initialise a trajectory by depending on a new alarm, and either to lengthen a trajectory or destroy a trajectory not depending on a new alarm, all this whilst economically treating cases of intersections.

There will further be found below important remarks concerning the definitions of the functions or elements used in this method.

DEFINITION OF NEIGHBOURHOOD

The distance d and the threshold $d_0$ define the neighbourhood of the alarms, that is to say the field, or the size of the field in which it is possible to seek neighbours for the alarms. The size of the neighbourhoods must be chosen as a function of the displacements of the targets.

Too small a neighbourhood may lead to absences of detection, or to losses of trajectory, whereas on the other hand definition of too large a neighbourhood raises the probability of erroneous or problematic matching. Thus, if a target is not detected for a certain number of images, the method remains locked onto the same trajectory.

It is therefore necessary to choose do as a multiple of the maximum displacement between 2 images. For example, if the maximum displacement is 2 pixels in 3 images, the value 6 pixels is chosen for $d_0$. For the sake of simplicity, the "chess distance" has been chosen, such that if M(i,j) and N(x,y) are two points in $R^2$:

$$d(M,N) = Max(|i-x|, |j-y|)$$

A very simple adaptation function for the distance threshold has been tested, for example for constant values:

$d_1, d_2$ confidence reference $f(x) = d_1$ if $x <$ confidence reference $= d_2$ if otherwise ($d_1 < d_2$).

Had the Euclidian distance been chosen, this distance would be more expensive in computing time.

DEFINITION OF THE ACTIVITY FUNCTION A

The activity measure for a trajectory sums the number of alarms found on this trajectory.

This summation can be carried out either over all images up to the current image (for example by means of a first order filter, linear recursive filter), or over a limited number of images by means of a linear non-recursive filter.

The second solution is chosen (limited number of images).

The activity A(h) is simply defined as the exact number of alarms found on the trajectory during the last K images.

Or stated otherwise: the activity A(h) is the exact number of matchings performed over a given trajectory during K images.

A binary word B(h) of K digits is required to carry out this operation. It will keep track of the past in order to compute the activity measure.

The updating functions More () and Less () effect the necessary binary shifts on B(h) and the digital counting.

DEFINITION OF THE CONFIDENCE MEASURE M

In the worst cases, the system must be capable of tracking an alarm under the following characteristic conditions:

the target is weakly contrasted and the background is very noisy.

Example: Detection rate 80%, with 50% of false alarms per image.

The target is a little larger than expected and the recording does not work well, this corresponding to low accuracy as regards the centre of the target (for example to errors of 1 to 2 pixels per image)

the target may be very slow (for example 1 pixel per image)

the target may have unsteady or difficult movements such as for example half-turns (helicopter trajectories).

In such circumstances, it is difficult to use a trajectory steadiness criterion. Moreover, 2 time-scales must be considered.

Example: When observed over a small time-scale, the target moving over a steady trajectory may be identified as a target without difficulty, whereas if it does a half-turn, it shows up as a persistent false alarm. It is regarded as an erratic target. It will therefore have to be observed over a larger time-scale in order to be able to identify it as a target. Finally, as targets with different speeds may simultaneously be present in the scene, the confidence measure should not depend on the speed of the targets.

Generally speaking, there may be trajectories which are not smooth and hence difficult to predict. It is sought to establish, whether, on average, movement is occurring efficiently. An efficiency criterion is therefore defined. We propose a confidence measure based on the efficiency of displacement of targets. For example, the ratio after K images:

distance as the crow flies $L_1$/distance actually travelled $L_2$.

In order to be more robust, X-displacements and Y-displacements are considered separately. We analyse whether there is efficiency at least in X or at least in Y. Maximum efficiency along the 2 axes of the image is thus considered. Moreover, the displacements as the crow flies and the distances actually travelled cannot be computed exactly over K images. This is why, in order to avoid computing sums, an operation which is very costly in memory space, use is made of 1st order recursive filters having a coefficient $\alpha$ tied to a first time scale. After effecting the measure over a small time scale, it is sought to sum this measure over a larger time scale so as to penalise stationary targets. The measure is thus summed through a second filter, with coefficient $\beta$, providing a result over a larger time scale.

Such a system for measuring the efficiency of movement is described in French Patent Application filed under No. 90 13 442, and is particularly well adapted to implementing the measure M of the present method.

The method according to the invention has the advantage of retaining only a restricted number of trajectories, thus avoiding combinatorial explosions. The limitation in the number of trajectories is obtained, on the one hand, by establishing an appropriate neighbourhood distance $d_0$ and, on the other hand, by destroying those trajectories whose activity measure is less than an appropriate threshold.

In particular, the protocol for treating intersections is particularly simple, since it amounts to regarding an intersection as an isolated alarm, from which new trajectories begin.

Given that, in the detection step, it is sought to visualise only:

those alarms whose confidence measure is strong or those alarms for which the counter is greater than zero, it results from this that we limit ourselves to visualising the strong trajectories, or the trajectories which arise from an intersection.

This protocol makes it possible to not multiply the potential trajectories. In fact, if two trajectories are initialised from the same alarm, they diverge rapidly and have their own history.

The method according to the invention can be implemented in a simple way with a programmable integrated circuit comprising the functions and the loops.

I claim:

1. A method of effecting a motion filtering for detecting point targets moving slowly within a time sequence of readjusted binary images, these images corresponding to a history at an instant n−1, denoted Hist n−1, including target trajectories and alarms, the method comprising:

A/ an initializing step having
　A1/ a sub-step of accumulating results arising from an extractor which include coordinates hj of start-points of the trajectories at the instant n−1 and coordinates Ci of the alarms at the instant n−1;

B/ a step for constructing a history at the next-following instant n, denoted Hist n, having two loops
　B1/ a first loop for producing either lengthening or initializing of the trajectories depending on the alarms received; and
　B2/ a second loop for producing either lengthening or destruction of the trajectories independent of the alarms received; and C/ a step for detecting the targets from observation of the history at the instant n, Hist n.

2. The method according to claim 1, wherein the initializing step A further comprises:
　A2/ a sub-step for copying the coordinates Ci into Hist n forming elements denoted hi'; and
　A3/ a sub-step for determining one or more neighborhoods in which one or more coordinates hj of Hist n−1 are found with respect to corresponding coordinates Ci by stipulating that a coordinate hj is found in the neighborhood of a coordinate Ci if the distance between the coordinate hj and the coordinate Ci is such that $d(C_i, h_j) < d_0$.

where $d_0$ is a predetermined distance.

3. The method according to claim 1, wherein in the step B for constructing the history at the instant n, Hist n, the first loop B1 comprises treatment of 3 cases as follows:
   a) a case in which in the neighborhood of a coordinate Ci there is no coordinate hj found relating to a trajectory in Hist n−1 by initializing in Hist n a new trajectory from the coordinate Ci;
   b) a case in which in the neighborhood of a coordinate Ci there is a single coordinate hj found relating to a trajectory in Hist n−1 by lengthening the trajectory in dependance on the alarm having the coordinate Ci; and
   c) a case in which in the neighborhood of a coordinate Ci there are several coordinates hj relating to valid trajectories of Hist n−1 by deleting an intersection, the point of intersection being the coordinate Ci, and initializing new trajectories in dependance on the alarm having the coordinate Ci, by disregarding the past, in Hist n.

4. The method according to claim 1, wherein in the step B for constructing the history at the instant n, Hist n, the second loop B2 comprises in a case in which in Hist n−1 there is a coordinate hj which is not situated in the neighborhood of a coordinate Ci, either transcribing the coordinate hj into Hist n, or eliminating it from Hist n according to the degree of activity of the coordinate hj.

5. The method according to claim 1, further comprising use of the following functions:
   an activity function A(h) for summing the number of times for which a coordinate hj has been associated with a given trajectory;
   a confidence measure M(h) for evaluating the reliability of a trajectory associated with a coordinate hj; and
   a counter T(h) for performing countdowns and which is turned on each time an intersection is detected;
   wherein values for initializing the functions are chosen such that
   $A_0$=an activity threshold,
   $M_0$=a confidence threshold, and
   START=turning on of the counter T(h).

6. A method according to claim 3, wherein in order to treat the 3 cases, the first loop B1 comprises:
   B11/ a first sub-loop for assigning active coordinates hj to a work register h; and
   B12/ a second sub-loop for updating an activity function A(h), a confidence measure M(h) and an intersection counter T(h).

7. The method according to claim 6, wherein in the first sub-loop B11;
   B11a/ in the case in which a coordinate Ci has no coordinates hj found as neighbors, nothing is done;
   B11b/ in the case in which a coordinate Ci has a single coordinate hj found as neighbor, the coordinate hj is assigned to a work register h such that hj=h, and the counter T(h) is reset to zero such that $T(hi')=0$;

and

B11c/ in the case in which a coordinate Ci has several coordinates hj found as neighbors, each of the coordinates hj whose activity is greater than an activity threshold $A_0$ is assigned to a work register h, and
   if there are at least 2 coordinates hj whose activity is greater than $A_0$, such that
   If $A(hj_1) > A(hj_2) > A_0$
   the counter T(h) is turned on such that
   $T(hi')$=START; or
   if there is only a single coordinate hj whose activity is greater than $A_0$, B11b is carried out
   and wherein in the second sub-loop B12:
   B12a/ the activity function A(h), the confidence measure M(h) and the counter T(h) are reset such that
   $A(hi')=A_0$
   $M(hi')=M_0$, where $M_0$ is a confidence threshold, and
   $T(hi')=0$
   with the result that a new trajectory depending on an alarm, in Hist n, is initialized;
   B12b/ the activity function A(h) and the confidence measure M(h) are updated by increasing the activity of an element hi' corresponding to the coordinate Ci in Hist n, and by decrementing the counter T(h) by one unit such that
   $A(hi')$=More (A(h))
   $M(hi')$=R(M(h), h hi'), and
   $T(hi')=T(h)−1$
   where the function More applied to A(h) renders the element hi' more active, function R is a function of two variables, the confidence measure M(h) and the vector h hi' which is the vector linking the coordinate hj of Hist n−1 with its correspondent hi' in Hist n; and
   B12c/ in the case in which there are several coordinates hj found close to a coordinate Ci and in which the counter T(h) equals START, an intersection has been detected and the confidence measure M(h) relating thereto are set to their initial values such that:

$M(hi')=M_0$.

8. The method according to claim 3, wherein the second loop B2 comprises:
   B21/ a first sub-loop for updating the activity of a coordinate hj of Hist n−1 which is not found in the neighborhood of any coordinate Ci because d(Ci, hj)(>$d_0$, where $d_0$ is a predetermined distance, the updating of the activity being done by revising an activity function A(h) relating thereto downwards with a function Less applied to the activity function A(h) such that
   A(hj)=Less; and
   B22/ a second sub-loop which applies to the case in which, at the termination of the first sub-loop B21, the activity of the coordinate hj is still greater than the activity of an activity threshold $A_0$, and in which the coordinate hj is transcribed into Hist n and a confidence measure M(h) therefor is updated with a function utilizing a vector h hi' which is a null vector corresponding to the fact that there has been no motion between Hist n−1 and Hist n such that
   hi'=hj, and
   M(hi')=R.

9. The method according to claim 6, wherein in the step C for detecting the targets from the history at the instant n, Hist n, detection is carried out for each element hi' of Hist n obtained from the coordinates Ci and hj of Hist n−1, and each element hi' is selected as a potential target each time that either $M(hi') > M_0$, where $M_0$ is a confidence threshold, or $T(hi') > 0$, indicating that a trajectory is reliable, or an intersection has been detected, respectively.

10. The method according to claim 2, wherein a distance $d_0$, which determines the extent of a neighborhood of a target, is a multiple of a maximum displacement between 2 images between the instants n−1 and n, and a distance d between two coordinates is a "chess" distance.

11. The method according to claim 5, wherein the activity further A(h) is defined as the exact number of alarms found on a given trajectory during the last K images, where K is a finite integer.

12. The method according to claim 5, wherein the confidence measure M(h) is based on the efficiency of displacement of the targets.

13. An apparatus for effecting a motion filtering for detecting point targets moving slowly within a time sequence of readjusted binary images, these images corresponding to a history at the instant n−1, denoted Hist n−1, including target trajectories and alarms, comprising:

A/ initializing means including:

A1/ means for accumulating results arising from an extractor which include coordinates hj of startpoints of the trajectories at the instant n−1 and coordinates Ci of the alarms at the instant n−1;

B/ means for constructing a history at the next-following instant n, denoted Hist n, having two loops B1/ a first loop for producing either lengthening or initializing of the trajectories depending on the alarms received; and B2/ a second loop for producing either lengthening or destruction of the trajectories independent of the alarms received; and C/ means for detecting the targets from observation of the history at the instant n, Hist n.

14. The apparatus according to claim 13, wherein said initializing means further comprises:

A2/ means for copying the coordinates Ci into Hist n forming elements denoted hi'; and A3/ means for determining one or more neighborhoods in which one or more coordinates hj of Hist n−1 are found with respect to corresponding coordinates Ci by stipulating that a coordinate hj is found in the neighborhood of a coordinate Ci if the distance between the coordinate hj and the coordinate Ci is such that $d(Ci,hj) < d_0,$ where $d_0$ is a predetermined distance.

* * * * *